(12) United States Patent
Ke et al.

(10) Patent No.: US 11,061,734 B2
(45) Date of Patent: Jul. 13, 2021

(54) PERFORMING CUSTOMIZED DATA COMPACTION FOR EFFICIENT PARALLEL DATA PROCESSING AMONGST A SET OF COMPUTING RESOURCES

(71) Applicant: salesforce.com, inc., San Francisco, CA (US)

(72) Inventors: Zhidong Ke, Milpitias, CA (US); Kevin Terusaki, Oakland, CA (US); Praveen Innamuri, Sunnyvale, CA (US); Narek Asadorian, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 114 days.

(21) Appl. No.: 16/264,399

(22) Filed: Jan. 31, 2019

(65) Prior Publication Data
US 2020/0250007 A1    Aug. 6, 2020

(51) Int. Cl.
*G06F 9/50* (2006.01)
*G06F 9/52* (2006.01)
*G06F 16/174* (2019.01)

(52) U.S. Cl.
CPC .............. *G06F 9/5055* (2013.01); *G06F 9/52* (2013.01); *G06F 16/1744* (2019.01)

(58) Field of Classification Search
CPC ....... G06F 9/5055; G06F 9/52; G06F 16/1744
USPC ........................................................ 718/104
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Chat C Do
*Assistant Examiner* — Bradford F Wheaton
(74) *Attorney, Agent, or Firm* — Dergosits & Noah LLP; Todd A. Noah

(57) ABSTRACT

Described is a system and method for compacting data into customized (e.g. optimal) file sizes for processing by computing resources. The mechanism may leverage various computing resources such as a cluster computing frameworks combined with a stream processing platform to efficiently process the activity data. For example, activity data of an organization may be processed by a set of jobs (or sub-jobs) as part of a data stream by a set of distributed computing resources. In order to efficiently process such data, the mechanism may compact the data into customized (e.g. optimal) file sizes. For example, the customized file sizes may provide an optimal (or near optimal) amount of data to be processed by each job, for example, to improve performance.

15 Claims, 6 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,539,706 B1 * | 5/2009 | Campbell ........... G06F 16/1827 |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0048154 A1 * | 3/2006 | Wu ........................ G06F 9/505 |
| | | 718/101 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0241118 A1 * | 9/2009 | Lingamneni ............ G06F 9/546 |
| | | 718/101 |
| 2010/0287429 A1 * | 11/2010 | Maruyama ..... G01R 31/318547 |
| | | 714/728 |
| 2011/0107053 A1 * | 5/2011 | Beckmann .......... G06F 16/1727 |
| | | 711/171 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0124978 A1 * | 5/2016 | Nithrakashyap ........ G06F 16/27 |
| | | 707/639 |

\* cited by examiner

PERFORMING CUSTOMIZED DATA COMPACTION FOR EFFICIENT PARALLEL DATA PROCESSING AMONGST A SET OF COMPUTING RESOURCES

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This disclosure relates to processing data, and more particularly, performing an efficient data compaction for processing the data by computing resources.

BACKGROUND

Various customer relationship management (CRM) software tools exist to aid organizations with managing interactions with customers and potential customers. These tools, however, rely on vast amounts of data that often results in unique data processing challenges. For example, managing such large amounts of data requires the efficient use of resources. In addition, such data may be required to be processed in real-time as part of a data stream. Several frameworks and services exist for managing such data streams. In some instances, such frameworks may include handling data using batches or micro-batches as an efficient allocation of computing resources. Micro-batch processes, however, often result in the production of an inordinate number of small files (also referred to as the "small files problem"). Accordingly, processing may incur a degradation in performance due to an increased number of required I/O operations. Moreover, merely increasing the file size may unduly burden memory utilization. As a result, there is a continued need to efficiently manage processing techniques when dealing with streaming data.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
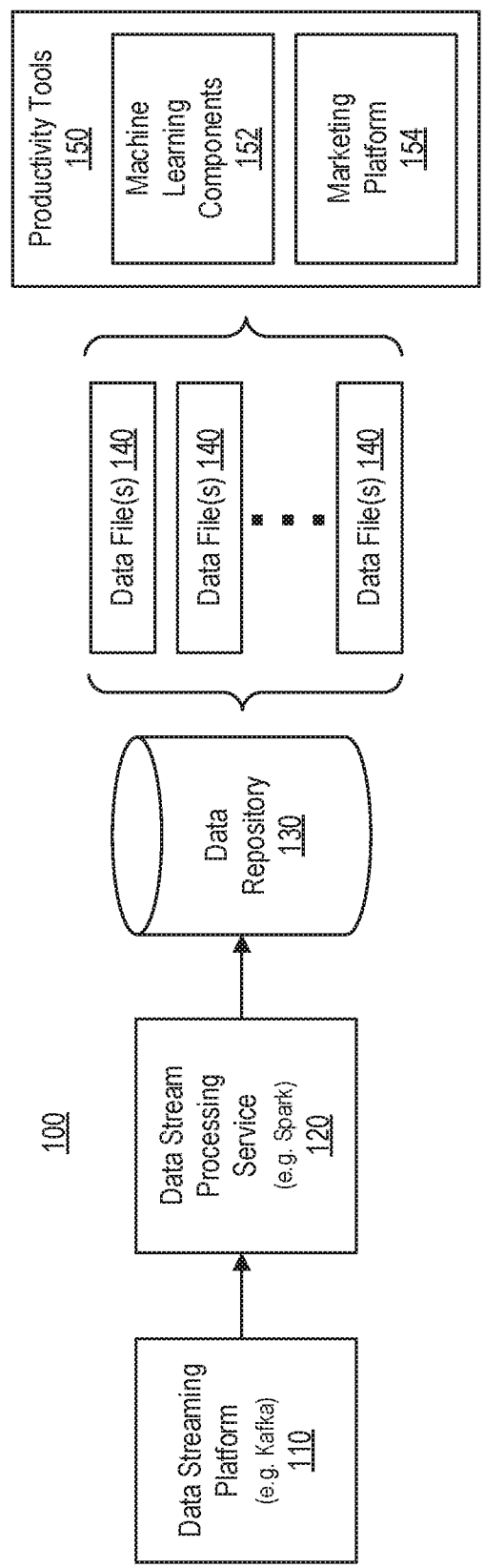
FIG. 1 is a block diagram illustrating an example overview of an operating framework for performing customized data compaction according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a mechanism (e.g. system and method) for compacting data into customized (e.g. optimal) file sizes for processing by computing resources. In some embodiments, the data may relate to activity data associated with an organization. For example, the organization may be associated with an on-demand database service such as a customer relationship management (CRM) platform. For instance, the activity data may be provided to machine learning components to provide various productivity tools for an organization that subscribes to CRM services (e.g. as a customer of the CRM platform). Accordingly, the mechanism may leverage various computing resources such as cluster computing frameworks combined with a stream processing platform to efficiently process the activity data. For example, activity data of an organization may be processed by a set of jobs (or sub-jobs) as part of a data stream by a set of distributed computing resources. As further described herein, in order to efficiently process such data, the mechanism may compact the data into customized (e.g. optimal) file sizes. For example, the customized file sizes may provide an optimal (or near optimal) amount of data to be processed by each job, for example, to improve performance. For example, when processing data as part of a distributed data streaming framework, too large of a file may cause a job to execute for an unnecessarily extended period of time and may be error prone, and too small of a file size may unnecessarily consume additional I/O overheard. Accordingly, in order to determine the appropriate file size, the mechanism may automate the process of calculating (or estimating) the most efficient file size for data compaction. In some embodiments, the mechanism may leverage existing metadata that is associated with activity data of an organization. For example, the mechanism may perform calculations based on metadata related to activity data files. For instance, the mechanism may determine an amount of activity data stored for an organization for a specified time period (e.g. a day), and then determine the number of days of activity data required to perform compaction that would result in a customized (e.g. optimal) file size. Accordingly, each job (or sub-job) may then be assigned to compact activity data for the determined number of days. For example, a scheduler may assign a set of jobs to execute on a distributed set of computing resources (e.g. a cluster of nodes). Accordingly, multiple compaction processes may be performed in parallel to improve overall performance.

Thus, in some embodiments, described is an efficient mechanism for improving the performance of processing data within a distributed data streaming framework. As a result, customers, for example, of a CRM service may benefit from an improvement from productivity tools such as machine learning features that rely on vast amounts of data.

FIG. 1 is a block diagram illustrating an example overview of an operating framework 100 for performing customized data compaction according to one or more embodiments of the disclosure. As shown, a general overview of an operating framework 100 may include a data streaming platform 110 (or service, framework, etc.) that may work in conjunction with a data stream processing service 120 (or platform, framework, etc.). In some embodiments, the data streaming platform 110 may produce real-time streaming data pipelines from which data is ingested and processed by the data stream processing service 120. For example, the real-time streaming data pipelines may be provided by the Apache Kafka platform although other platforms (or services) are contemplated. In some embodiments, the ingestion of data may occur using several real-time micro-batch jobs. For example, a data stream processing job of the data stream processing service 120 may listen to a queue of the streaming platform 110 and process activity data by batching activities per organization. The data stream processing service 120 (e.g. API) may provide various functionality (e.g. algorithms) for processing live data streams including high-level functions such as map, reduce, join, window, etc. For example, the data stream processing service (or platform) may include Spark Streaming service provided by the Apache Spark framework, although other services are also contemplated. In some embodiments, the data streaming platform 110 and data stream processing service 120 may be part of, or work in conjunction with, an on-demand database services system (or platform) as further described herein. In some embodiments, when data is processed by the data stream processing service 120 it may be stored in a data repository 130. For example, the real-time data may relate to activity data of an organization, and accordingly, such activity data may be stored within the data repository 130. Accordingly, the data repository 130 in turn may store data files (or activity data files) 140. As referred herein, data and activity data is contemplated to include any type of data or information that may be stored, for example, to be used for various productivity tools. The data may be stored in any suitable manner. For example, in some embodiments, the data may be stored using a distributed key-value object store.

The data files 140 may be used for various productivity tools 150 provided by a service provider (e.g. on-demand database services provider). For example, such productivity tools 150 may include machine learning components 152 that use (e.g. input) such data to improve software functionality. The productivity tools 150 may also include a marketing platform 154 that may include one or more tools available to organizations. For example, the marketing platform may access the activity data and perform various tasks or analysis.

As described above, the data stream processing service 120 may use micro-batch processing for storing data in real-time. However, micro-batched activity data files may potentially cause downstream side effects. For example, the ratio of the number of files compared to the average file size may be skewed, and as a result, performance due to an increase of I/O per input size may degrade. Accordingly, as further described herein, the mechanism of embodiments of the disclosure may compact activity data into customized (or optimal) files sizes to increase performance. In some embodiments, the mechanism may leverage metadata to create customized activity data files as shown in FIG. 2.

Figure 2:
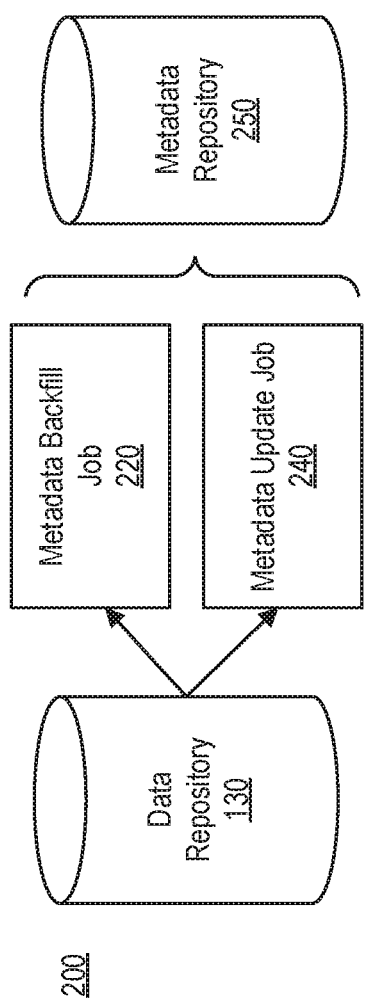
FIG. 2 is a block diagram illustrating an example overview of collecting and storing metadata when performing customized data compaction according to one or more embodiments of the disclosure.

FIG. 2 is a block diagram illustrating an example overview 200 of collecting and storing metadata when performing customized data compaction according to one or more embodiments of the disclosure. As shown, the system may perform a metadata backfill job 220 to obtain (or collect, retrieve, etc.) metadata from the data repository 130. In addition, the system may perform a metadata update job 240 to consistently update a metadata repository 250. For example, the metadata update job 204 may perform a near real-time job to update the metadata repository 250. When obtaining metadata, the system may query the data repository 130 and perform various calculations (or estimations) as further described herein, and write various metadata to a metadata repository (or storage) 250. In some embodiments, the system may store metadata such as a number of activity data files, file sizes (or average file sizes), number of users, creation dates, etc. Accordingly, such metadata may then be leveraged to perform a customized data compaction as shown in FIG. 3.

Figure 3:
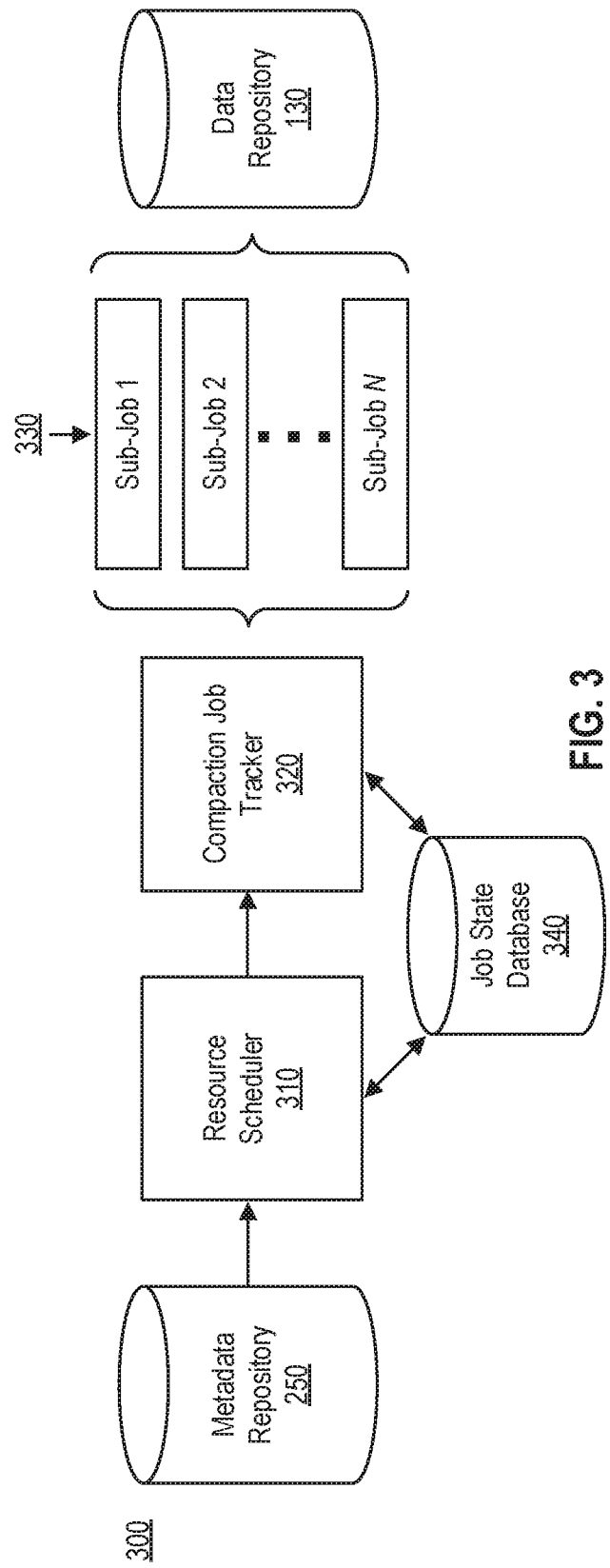
FIG. 3 is a block diagram illustrating an example overview of an interaction of components when performing a customized data compaction according to one or more embodiments of the disclosure.

FIG. 3 is a block diagram illustrating an example overview 300 of an interaction of components when performing a customized data compaction according to one or more embodiments of the disclosure. As shown, the system may utilize a resource scheduler 310 to efficiently manage data compaction. For example, the system may intelligently schedule jobs (or sub-jobs) based on a proposed input size. For example, the system may perform various estimations (or calculations) to determine a customized activity data file size (e.g. as further described herein with reference to FIG. 4). In some embodiments, the resource scheduler 310 may perform such calculations. For example, as shown, the resource scheduler 310 may access the metadata repository to obtain and/or calculate the average activity data file size, number of files, and total days of activity data stored (e.g. time span of activity). The scheduler 310 may then estimate the size of creating a compacted activity file for a specified time period (e.g. one day). Accordingly, the scheduler may then assign each sub-job 330 a number of days such that the file size (or amount of data) is customized (or optimized). For example, the customized file size may be selected to ensure the file size is not too large an amount of data for the memory of the executor. The sub-jobs 330 may then write the compacted activity data to the data repository 130. As shown, the scheduler 310 may also interact with a compaction job tracker 320. The compaction job tracker 320 may track all of the sub-jobs and their states by maintaining a job state database 340. For example, upon a sub-job completing a required compaction, the sub-job may be placed in a completed state. Accordingly, the system provides additional benefits such as an efficient failure recovery system. For example, by breaking the compaction into several sub-jobs, the system may create various checkpoints, to recovery from in the event of an unexpected failure. As a result, if a sub-job fails during processing (e.g. compaction), the sub-job may be resumed and completed on a subsequent execution (or run). In addition, the system may provide further efficiencies by implementing distributed compaction. For example, by breaking up the compaction into discrete sub-jobs, the system can increase parallelism by executing multiple sub-jobs at once. As a further benefit of the compaction framework described above, the system may efficiently identify particular records for removal (e.g. for GDRP compliance). For example, the system may more efficiently identify records associated with a particular customer of an organization by processing the compacted activity data files.

Figure 4:
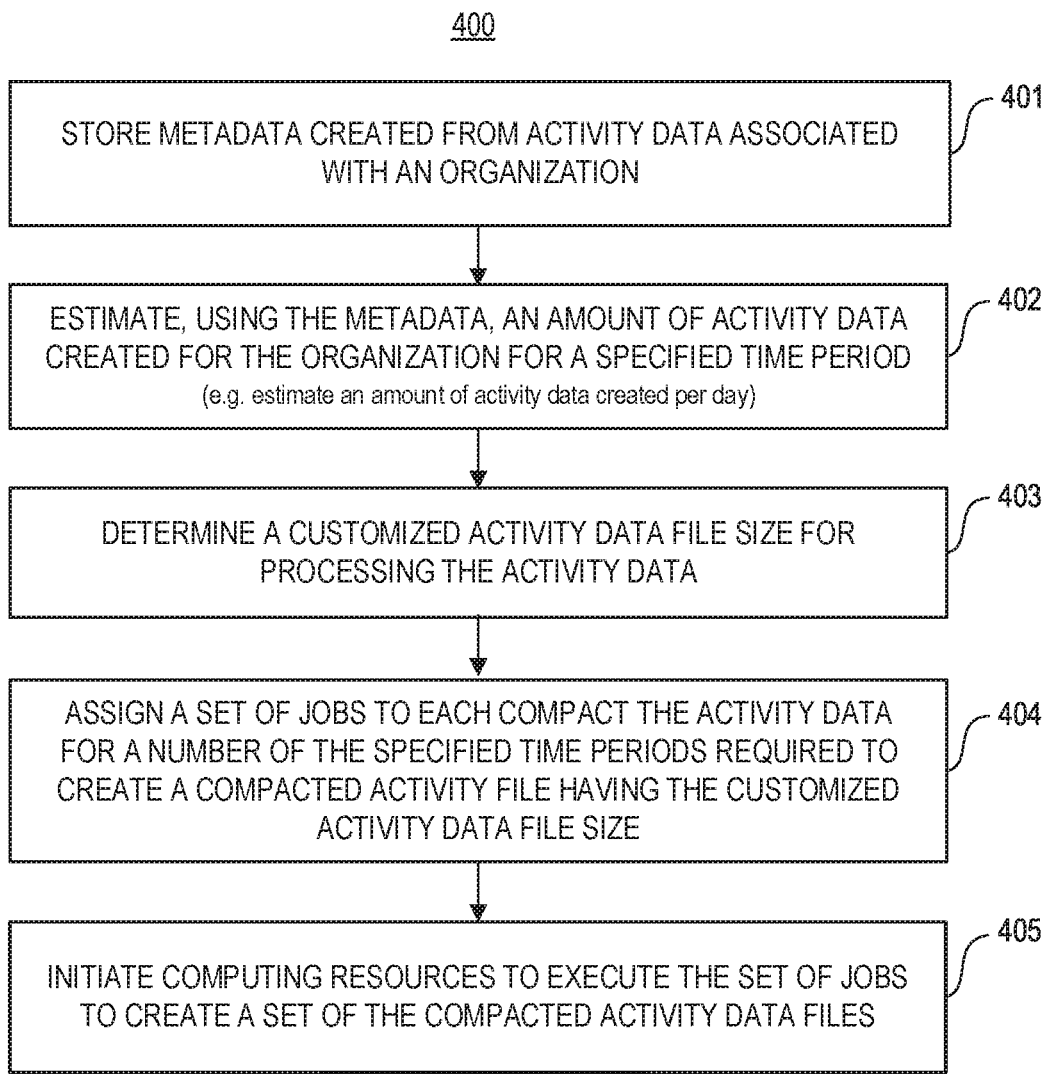
FIG. 4 is a process flow diagram 400 illustrating an example method of performing a customized data compaction according to one or more embodiments of the disclosure.

FIG. 4 is a process flow diagram 400 illustrating an example method of performing a customized data compaction according to one or more embodiments of the disclosure. Process 400 may use processing logic, which may include software, hardware, or a combination thereof. For example, process 400 may be performed by a system including one or more components described in the operating environment 100.

In 401, the system may store metadata created from activity data associated with an organization. In some embodiments, the activity data may be stored in one or more activity data files as part of a data repository. In some embodiments, the system may collecting metadata from the data repository and update a metadata repository. For example, the system may initiate a job to perform real-time updates to the metadata repository.

In 402, the system may estimate (or calculate) an amount of activity data created for the organization for a specified time period. In some embodiments, the system may use the metadata to perform such an estimation.

As described, the metadata may include information related to data and data files. In some embodiments, the metadata may relate to activity data and activity data files. For example, the metadata may include various information regarding activity files stored in a data repository such time and date information such as creation and modification dates. In addition, the metadata may include date information related to the activity data itself. For example, the metadata may directly or indirectly indicate the time at which certain organization activity occurred. In addition, the metadata may include information related to the amount of data stored. For example, the metadata may include information related to the number of records, values, data fields, etc. stored within the data repository. In addition, the metadata may include information about the size of activity data files (e.g. in MBs, GBs, TBs, etc.).

In some embodiments, the system may store the results of the estimation as metadata within a metadata repository or storage (e.g. metadata repository 250). In addition, the system may create such metadata prior to compacting activity data. For example, the system may perform scheduled calculations (or estimations) to predict the amount of compacted activity data created (e.g. file size) created for a time period (e.g. one day) and store such information as metadata. Accordingly, the system may then retrieve such data and determine the number of days and jobs required to compact the activity data to create efficient files sizes for processing. In addition, in some embodiments, the system may perform such calculations in response to initiating a procedure to compact data. For example, the system may dynamically (or in real-time, or near real-time) perform various estimations on the most recently updated or created metadata. For example, the system may obtain (or retrieve) the relevant metadata to perform such calculations of part of the compaction procedure.

In some embodiments, estimating the amount of activity data created for the organization for the specified time period may include perform various calculations. For example, the system may determine a total number of activity data files stored for the organization. In addition, the system may calculate an average file size for the activity data files. For instance, the system may divide the total amount of activity data stored for an organization (e.g. terabytes) by the total number of data or activity files (e.g. thousands). In addition, the system may identify a time span of activity of the organization stored in the activity data files (e.g. a number of days). Accordingly, the system may estimate the amount of activity data created for the specified time period (e.g. one day) using the total number of activity data files, the average file size, and the time span. For example, the system may estimate the amount activity data created for a day, and thus, also estimate the amount of data that would result in compacting activity data for one day.

In 403, the system may determine a customized activity data file size for processing the activity data by a set of computing resources. In some embodiments, the customized activity data file size may be an optimal (or near optimal) file size that balances performance and overhead. For example, the customized activity data file size may be determined to provide an improved balance between memory management, I/O overhead, error prevention, etc. In some embodiments, the customized activity data file may be determined from statistical information that may be maintained. For example, performance history related to previous data compaction process may be maintained. Accordingly, the system may perform various analyses to constantly update the customized activity data file size.

In 404, the system may assign a set of jobs to compact the activity data for a number of the specified time periods required to create a compacted activity data file having the customized activity data file size. For example, if it is determined that an optimal input size is approximately 30 GBs, and the system determines that the average amount of activity data generated for one day (e.g. specified time period) is approximately 1 GB, the system may determine the number of specified time periods required to create a compacted activity file having the customized activity data file size (e.g. 30 GBs) is 30 days (or approximately one month of activity data). As described, in some embodiments, the specified time period may include one or more days, and accordingly, each of the set of jobs compacts activity data for the number of days required to create the compacted activity file having the customized activity data file size. It should be noted, however, that any suitable time period (e.g. minutes, hours, days, etc.) and time spans are contemplated.

In some embodiments, the assignment may be performed by a scheduler (or scheduling component). For example, the scheduler may obtain (or retrieve) the metadata and assign jobs to compact activity data for a defined number of days accordingly. In some embodiments, the scheduler may perform the estimations (or calculations), for example, as described in 902. The system may also perform additional calculations when assigning jobs to perform the data compaction. In some embodiments, the system may determine a number of jobs required for the set of jobs to create the set of the compacted activity data files for the time span of activity. For example, the system may calculate the number of compacted activity files required to compact data for the time span of activity stored in the activity data files. For example, the system may determine the time span of activity data for an organization is one year, and the customized activity data file size requires one month of activity data, the system may accordingly determine that twelve activity data files are required (e.g. the number of months in the year).

In 405, the system may initiate the computing resources to execute the set of jobs to create the set of compacted activity data files. As described, one or more of the set of jobs may execute concurrently (e.g. simultaneously, in parallel, etc.). For example, using the above example, the system may determine that twelve jobs (e.g. one for each of the months) are required to create the set of compacted activity data files. In some embodiments, the system implement a compaction job tracker to keep track of the various jobs or sub-jobs. For example, the system may initiate a job to track the set of jobs by storing a current state for each job, and update each of the set of jobs to a completed state once the compacted activity file is created. Accordingly, the system may provide an efficient failure recovery system. For example, by breaking the compaction into several sub-jobs, the system may create various checkpoints, in addition to effective memory management, to recovery from an unexpected failure. As a result, if a sub-job fails during processing (e.g. compaction), the sub-job may be resumed and completed on a subsequent execution (or run).

Accordingly, in some embodiments, described is an efficient mechanism for improving the performance of compacting data within a distributed data streaming framework.

In some embodiments of the disclosure, the mechanism may be used in conjunction with an on-demand database service.

Figure 5:
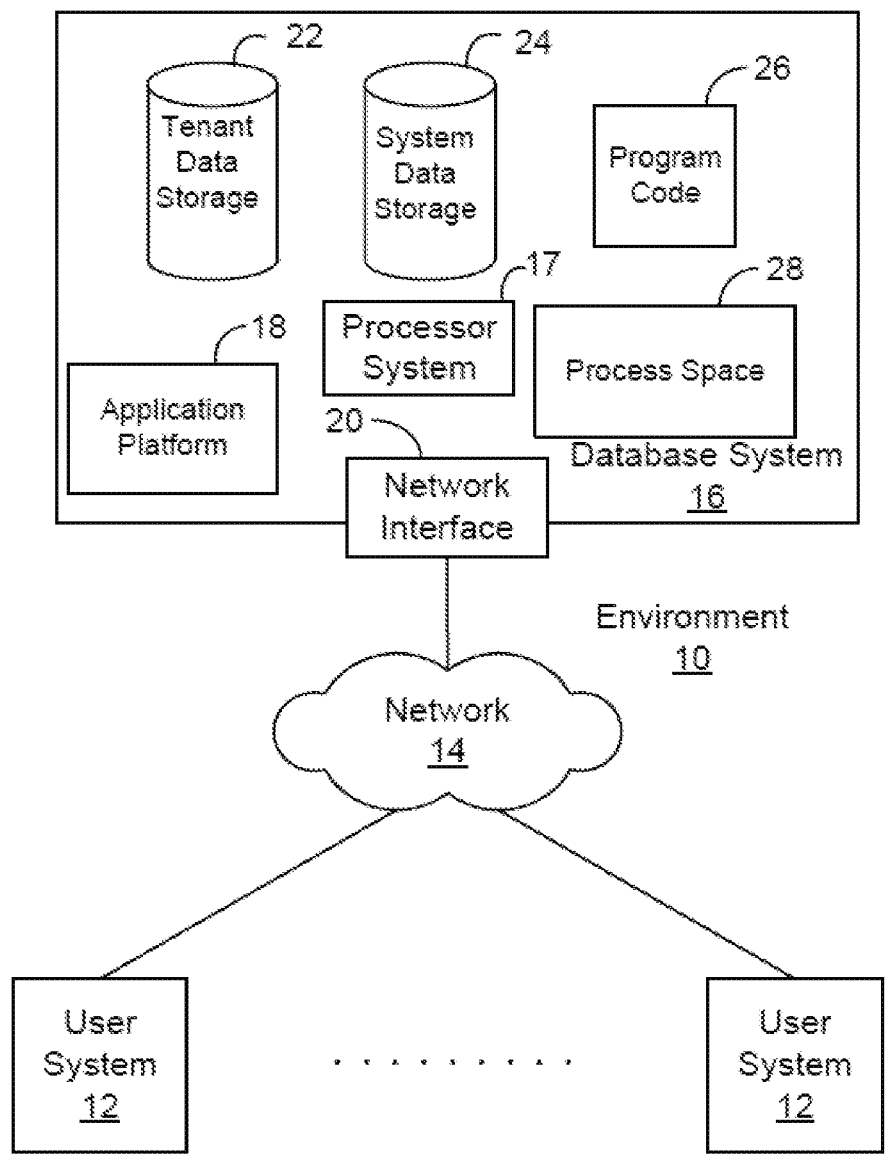
FIG. 5 is a block diagram illustrating of an example environment in which on-demand database services may be used in conjunction with one or more embodiments of the disclosure.

FIG. 5 is a block diagram illustrating of an example environment 10 in which on-demand database services may be provided to be used in conjunction with one or more embodiments of the disclosure.

Environment 10 may include user systems 12, network 14, database system 16, processor system 17, application platform 18, network interface 20, tenant data storage (or data store) 22, system data storage (or data store) 24, program code 26, and process space 28. In other embodiments, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As shown, user systems 12 might interact via a network 14 with an on-demand database service, which is implemented, in this example, as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some embodiments, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some embodiments, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one embodiment, system 16 may implement a web-based CRM system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

In one embodiment, an arrangement for elements of system 16 may include a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in this example include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one embodiment, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the embodiments described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed embodiments can be realized in any programming language that can be executed on a client system and/or server or server system such as, for example, C, C++, HTML, any other markup language, Java, JavaScript, ActiveX, any other scripting language, such as VBScript, and many other programming languages as are well known may be used.

According to some embodiments, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6:
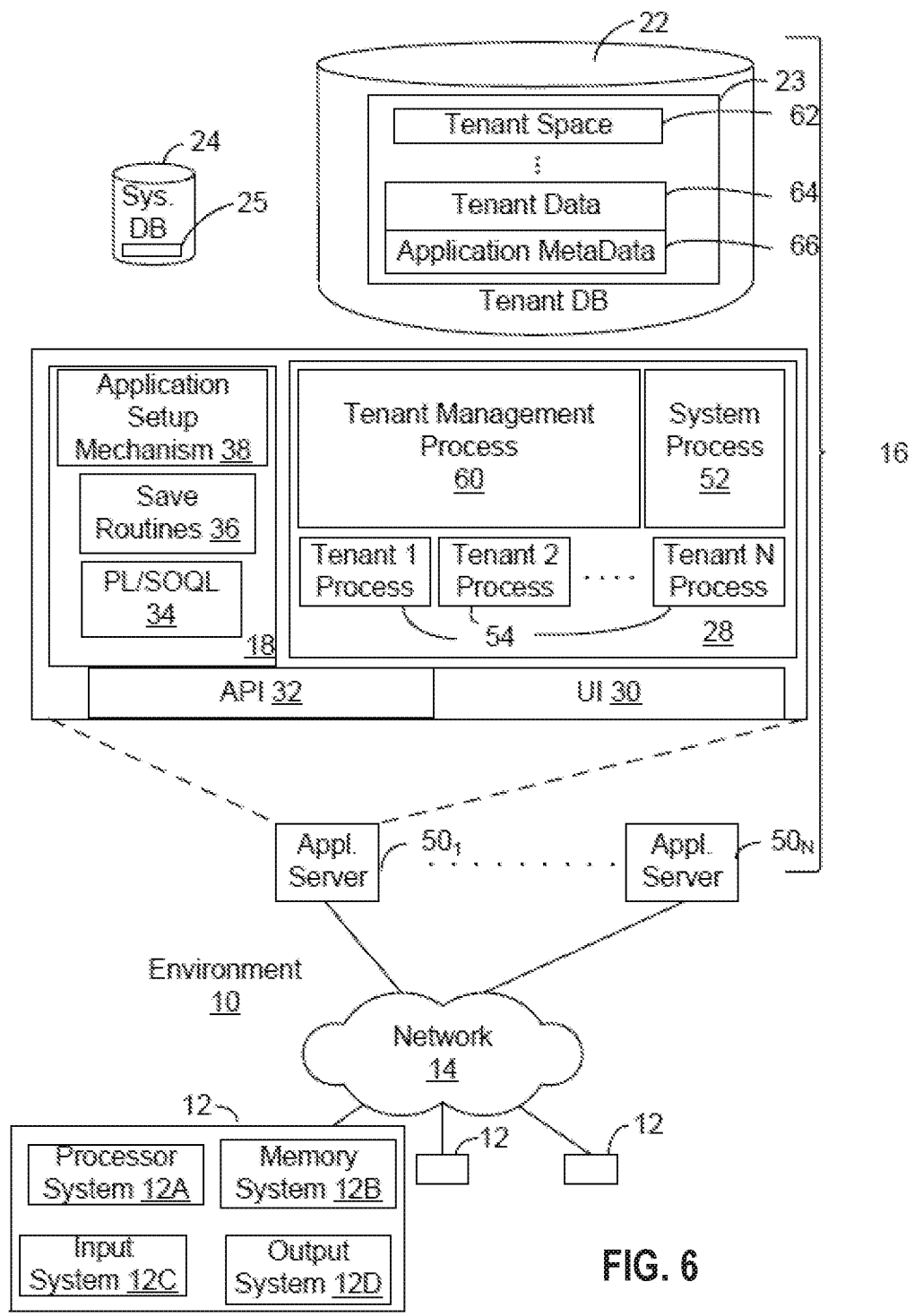
FIG. 6 is a block diagram illustrating an of example of elements of FIG. 5 and various possible interconnections between these elements according to one or more embodiments of the disclosure.

FIG. 6 is a block diagram illustrating an of example of elements of FIG. 5 and various possible interconnections between these elements according to one or more embodiments of the disclosure.

As shown, elements of system 16 and various interconnections in some embodiments are further illustrated. As shown, in one embodiment, the user system 12 may include processor system 12A, memory system 12B, input system 12C, and output system 12D. This example shows network 14 and system 16, and also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 50$_1$-50$_N$, system process space 52, tenant process spaces 54, tenant management process space 60, tenant storage space 62, user storage 64, and application metadata 66. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown in this example, system 16 may include a network interface 20 implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Figure 7:
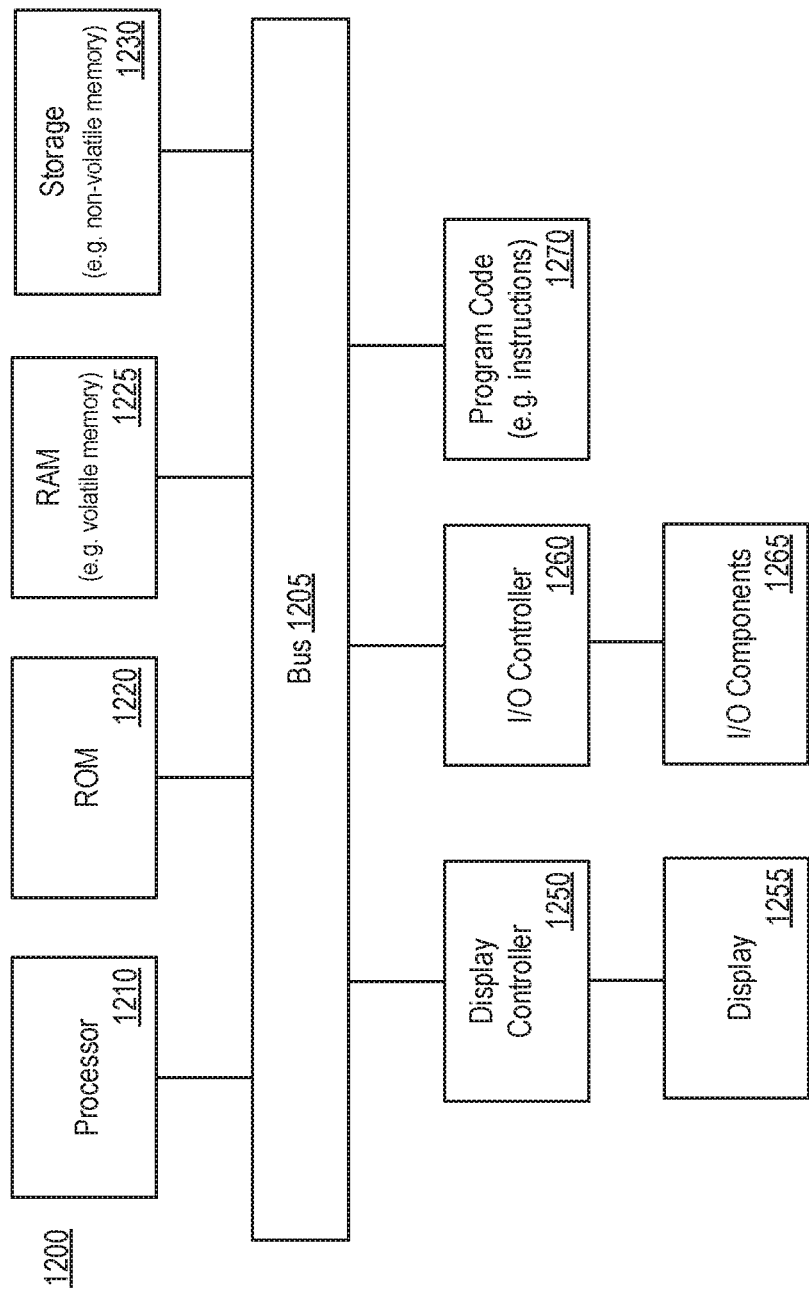
FIG. 7 is a block diagram illustrating an example of a computing system that may be used in conjunction with one or more embodiments of the disclosure.

FIG. 7 shows a block diagram of an example of a computing system that may be used in conjunction with one or more embodiments of the disclosure. For example, computing system 1200 (or system, or server, or computing device, or device) may represent any of the devices or systems (e.g. system 160, system 16, automation building tool 191, etc.) described herein that perform any of the processes, operations, or methods of the disclosure. As referred to herein, a system, for example, with reference to the claims, may include one or more computing systems that may include one or more processors. Note that while the computing system 1200 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor (or processors) 1210 may retrieve stored instructions from one or more of the memories 1220, 1225, and 1230 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein. As referred to herein, for example, with reference to the claims, a processor may include one or more processors. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 may represent any of the instructions, applications, software, libraries, toolkits, modules, components, engines, units, functions, logic, etc. as described herein. Program code 1270 may reside, completely or at least partially, within the memories described herein (e.g. non-transitory computer-readable media), or within a processor during execution thereof by the computing system. Program code 1270 may include both machine code, such as produced by a compiler, and files containing higher-level or intermediate code that may be executed by a computing system or other data processing apparatus (or machine) using an interpreter. In addition, program code 1270 can be implemented as software, firmware, or functional circuitry within the computing system, or as combinations thereof. Program code 1270 may also be downloaded, in whole or in part, through the use of a software development kit or toolkit that enables the creation and embodiment of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
store metadata created from activity data associated with an organization, the activity data stored in one or more activity data files as part of a data repository;
estimate, using the metadata, an amount of activity data created for the organization for a specified time period comprising determining a total number and average file size of the activity data files and identifying a time span of activity data stored in the activity data files;
determine an optimal customized activity data file size for processing the activity data by a set of computing resources;
determine a number of specified time periods required to create a compacted activity data file having the optimal customized activity data file size based on the estimated amount of activity data;
assign a set of jobs to compact the activity data for the determined number of the specified time periods comprising determining a number of jobs required to create the set of the compacted activity data files for the time span of activity; and
initiate the computing resources to execute the set of jobs to create a set of the compacted activity data files, one or more of the jobs executing concurrently.

2. The system of claim 1, wherein the specified time period includes one or more days, and each of the jobs compacts activity data for the number of days required to create the compacted activity file having the customized activity data file size.

3. The system of claim 1, wherein storing the metadata created from activity data associated with an organization includes:
collecting metadata from the data repository; and
updating, by scheduling a real-time job, to update a metadata repository.

4. The system of claim 1, the plurality of instructions when executed further causing the one or more processors to:
track the set of jobs by storing a current state for each job; and
update each of the jobs to a completed state once the compacted activity file is created.

5. The system of claim 4, the plurality of instructions when executed further causing the one or more processors to:
resume the creation of the compacted activity data file in response to a failure of a job by referencing the stored current state for the job.

6. A computer program product, comprising a non-transitory computer readable medium having a computer-readable program code embodied therein to be executed by one or more processors, the program code including instructions to:
store metadata created from activity data associated with an organization, the activity data stored in one or more activity data files as part of a data repository;
estimate, using the metadata, an amount of activity data created for the organization for a specified time period comprising determining a total number and average file size of the activity data files and identifying a time span of activity data stored in the activity data files;
determine an optimal customized activity data file size for processing the activity data by a set of computing resources;
determine a number of specified time periods required to create a compacted activity data file having the optimal customized activity data file size based on the estimated amount of activity data;
assign a set of jobs to compact the activity data for the determined number of the specified time periods comprising determining a number of jobs required to create the set of the compacted activity data files for the time span of activity; and
initiate the computing resources to execute the set of jobs to create a set of the compacted activity data files, one or more of the jobs executing concurrently.

7. The computer program product of claim 6, wherein the specified time period includes one or more days, and each of the jobs of the set of jobs compacts activity data for the number of days required to create the compacted activity file having the customized activity data file size.

8. The computer program product of claim 6, wherein storing the metadata created from activity data associated with an organization includes:
collecting metadata from the data repository; and
updating, by scheduling a real-time job, to update a metadata repository.

9. The computer program product of claim 6, the program code including further instructions to:
track the set of jobs by storing a current state for each job; and
update each of the jobs to a completed state once the compacted activity file is created.

10. The computer program product of claim 9, the program code including further instructions to:
resume the creation of the compacted activity data file in response to a failure of a job by referencing the stored current state for the job.

11. A method comprising:
storing, by a database system, metadata created from activity data associated with an organization, the activity data stored in one or more activity data files as part of a data repository;
estimating, by the database system using the metadata, an amount of activity data created for the organization for a specified time period comprising determining a total number and average file size of the activity data files and identifying a time span of activity data stored in the activity data files;
determining, by the database system, an optimal customized activity data file size for processing the activity data by a set of computing resources;
determining, by the database system, a number of specified time periods required to create a compacted activity data file having the customized activity data file size based on the estimated amount of activity data;
assigning, by the database system, a set of jobs to compact the activity data for the determined number of the specified time periods comprising determining a number of jobs required to create the set of the compacted activity data files for the time span of activity; and
initiating, by the database system, the computing resources to execute the set of jobs to create a set of the compacted activity data files, one or more of the jobs executing concurrently.

12. The method of claim 11, wherein assigning the set of jobs to compact the activity data for the number of the specified time periods includes:

- determining, by the database system, a number of jobs required for the set of jobs to create the set of the compacted activity data files for the time span of activity.

13. The method of claim 12, wherein the specified time period includes one or more days, and each of the jobs compacts activity data for the number of days required to create the compacted activity file having the customized activity data file size.

14. The method of claim 11, wherein storing the metadata created from activity data associated with an organization includes:

- collecting metadata from the data repository; and
- updating, by scheduling a real-time job, to update a metadata repository.

15. The method of claim 11, further comprising:

- tracking the set of jobs by storing a current state for each job; and
- updating each of the jobs to a completed state once the compacted activity file is created.

\* \* \* \* \*